Figures 1, 2:
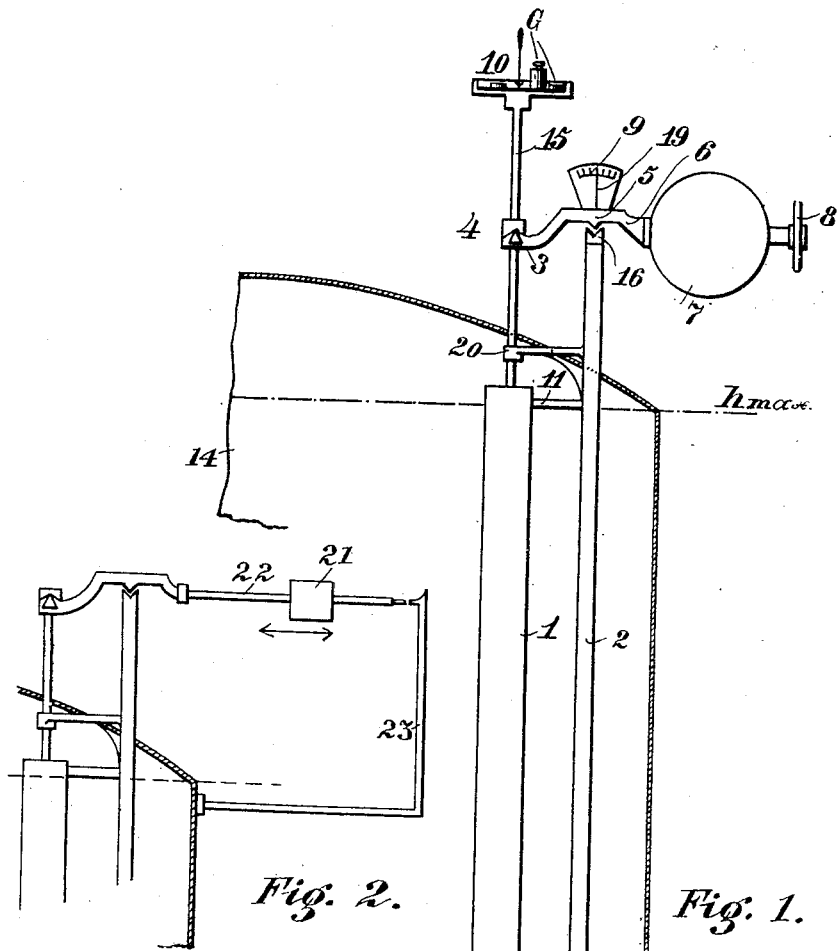

T. C. J. HILLMER.
APPARATUS FOR WEIGHING LIQUIDS IN STORAGE TANKS.
APPLICATION FILED FEB. 19, 1909.

967,378.

Patented Aug. 16, 1910.

Witnesses

Inventor
Theodor Carl Johann Hillmer
by B. Singer
Attorney

UNITED STATES PATENT OFFICE.

THEODOR CARL JOHANN HILLMER, OF BUCHAREST, ROUMANIA.

APPARATUS FOR WEIGHING LIQUIDS IN STORAGE-TANKS.

967,378.  Specification of Letters Patent.  Patented Aug. 16, 1910.

Application filed February 19, 1909. Serial No. 478,950.

*To all whom it may concern:*

Be it known that I, THEODOR CARL JOHANN HILLMER, a citizen of Germany, residing at Bucharest, Roumania, have invented new and useful Improvements in Apparatus for Weighing Liquids in Storage-Tanks, of which the following is a specification.

The estimation of the weight of liquids stored in vessels presents many difficulties. This is especially so with liquids having a different specific gravity from water. Mistakes are liable to be made in the calculation of the weight of the stored liquid through errors in the estimation of the specific gravity and the height of the liquid. Moreover, stored liquids such as petroleum, spirits and the like are often of different specific gravity at different depths, which makes the estimation of the average weight by the use of the ordinary process of weighing very difficult.

Correct results can be obtained by means of the present invention, in which the liquid is weighed directly; it has the advantage of giving the total weight of the stored liquid straight off without any cumbersome and tedious measurements and calculations.

In the drawing, Figure 1, is a front elevation of the apparatus. Fig. 2, is a part elevation of a modification of the same.

The invention is an application of the well known hydrometer. It consists of a prismatic or cylindrical immersed body 1 which is fitted in the vessel 14 in such a manner that its lower end is level with the datum line, *i. e.* the lowest level to which the liquid can be emptied. This immersed body must fulfil two conditions.

(1) It must be of known and the same cross-section $f$ throughout its whole length $o-h$ when the storage tank is of uniform cross section from top to bottom. When the tank is not of the same cross section throughout, the body must be so made, that the ratio of its cross section to that of the tank in every plane, at right angles to their respective axes, is constant.

(2) These cross sections $f$ and F, of the floating body and the storage tank must be exactly determined.

The body 1 is suspended vertically near a lath 2, which is made of the same material, in such a manner that its lower end can touch the tip of the arm 13, which is just under the datum line. Transverse projections 11 preferably attached to the floating body 1 and in engagement with the lath 2 serve for maintaining the body in parallel relation with the lath. The body 1 is continued in a co-axial rod 15 made of the same material and projecting above the top of the tank.

A balance beam is fitted on a knife edge 5 at the top of the lath 2 so that it can turn about a point 16. This beam may have equal or unequal arms. On one arm of the beam the floating body 1 is freely suspended on a knife edge 3. On the other arm hangs a weight 7 which can be moved by a micrometer screw 8, so that when the beam is at rest and the tank empty the lower end of the body 1 is on the datum line. It may be pointed out here that any expansion due to temperature difference will not alter the position of the lower end of the body 1. For since the body 1, the lath 2 and the rod 15 are made of the same material any extension will be compensated. A scale pan 10 is fitted to the top of the rod 15 on which weights may be placed and guides 11, running along the lath 2, guide the body 1 in relative position to the lath 2, as said body slides up and down. The pointer 19 shows on the scale 9, fitted to the top of the lath 2, whether the body 1 is in its zero position.

There is a certain amount of upward play for the body 1 which may be especially fixed. This play is limited by a buffer spring stop 20 and is capable of taking up the upward thrust of the floating body 1 even when the tank is filled to the top.

The method of weighing is as follows: The known cross section $f$ of the body 1 is put equal to 1 and the known cross section of the tank is called F. Knowing that the upward thrust of the liquid is equal to the liquid displaced by the immersed body and that the ratio of the cross-sections of body to tank is everywhere $1:F$, it follows that the ratio of the volume of the liquid contained from O to the surface $h$ of the liquid is to the volume of liquid displaced by the body 1 as $F:1$. When the pan 10 is now loaded with weights G till the lower end of the immersed body 1 is brought to datum, these weights will give the weight of liquid displaced and need only be multiplied by F to give the weight of liquid in the tank 14 between levels O and $h$.

The weights G placed in the pan 10 could be marked with a weight increased in the ratio of $\frac{F}{f}$ thus simplifying the weighing in practice. If the cross section of the immersed body $f$ is equal to 1 and that of the reservoir equal to F, then the weights G must be marked with a weight equal to G F, thus giving the weight of liquid contained between levels O and $h$ without any further calculation.

In practice it often happens owing to peculiarities in erection, that the cross section is not the same throughout. If these deviations have any practical value, the body must be of such a shape that the ratio of its cross section to that of the tank is as $f:F$ at any level. Then because the displaced liquid as actually weighed still bears a ratio of $f:F$ to the weight of liquid in the reservoir, the results of the weighing in such a case would be correct. The same applies to conical tanks.

The modification shown in Fig. 2, comprises a scale beam 22 on which a jockey weight 21 is slidably mounted. An angular beam 23 preferably secured to the wall of the casing is provided with a lateral projection on its top end, said projection being directly in opposition with the scale beam 22 when the float 1 is in its zero point. The scale beam 22 can be graduated to read directly the weight of the liquid in the tank, instead of the weight of the liquid displaced.

Having now particularly described and ascertained the nature of my said invention and in what manner the same is to be performed I declare that what I claim is:—

1. An apparatus for weighing liquids in a vessel, comprising in combination, a body suspended in said liquid and adapted to float therein, the cross-section of said body being of a constant ratio with respect to the cross-section of said vessel, a rod in co-axial alinement with said body and rigidly connected therewith, means for counterbalancing said body when the liquid has reached its lowest level and weight receiving means above said body for returning the same to that position in which the same rests, when the liquid in the vessel has reached its lowest level.

2. An apparatus for weighing liquid in a vessel, comprising in combination, a body suspended in said liquid and adapted to float therein, the cross-section of said body being of a constant ratio with respect to the cross-section of said vessel, a rod in co-axial alinement with said body and rigidly connected therewith, means for counterbalancing said body when the liquid has reached its lowest level, means for guiding said body in vertical position, and weight receiving means in superposition with respect to said body for returning the same to that position, in which the same rests when the liquid in the vessel has reached its lowest level.

3. An apparatus for weighing liquid in a vessel, comprising in combination a body suspended in the liquid and adapted to float therein, the cross-section of said body being of a constant ratio with respect to the cross-section of said vessel, a rod in co-axial alinement with said body and mounted thereon, an element disposed in said vessel in parallel arrangement with said body and adapted to support the same in its lowermost position, a transverse member oscillatably mounted on said element, said rod and body being oscillatably supported from said transverse member, weight receiving means for returning said body in the position in which the same rests when the liquid has reached its lowest level, and means in coaction with said transverse member for indicating the lowermost position of said body.

4. An apparatus for weighing liquid in a vessel, comprising in combination, a body suspended in said liquid and adapted to float therein, the cross-section of said body being of a constant ratio with respect to the cross-section of said vessel, a rod in co-axial alinement with said body and mounted thereon, a pan fixed to the top of said rod, an element disposed in said vessel in parallel arrangement with said body and adapted to support the same in its lowermost position, said element and said body being adapted to expand or contract to the same extent under the influence of temperature, a transverse member oscillatably mounted on said element and provided with a knife edge fulcrum at one end, said rod and body being suspended from said fulcrum, means in coaction with said member for indicating when said body is in its lowermost position and weights for returning said body in the position in which the same rests, when the liquid has reached its lowest level.

Dated this 29th day of January 1909.

In testimony whereof I have signed my name to this specification in the presence of two subscribing witnesses.

THEODOR CARL JOHANN HILLMER.

Witnesses:
  GEOGE DONATI,
  S. B. ACKER.